United States Patent
Hokkanen et al.

(10) Patent No.: US 8,701,627 B2
(45) Date of Patent: Apr. 22, 2014

(54) ARRANGEMENT AND METHOD FOR EFFICIENT COMBUSTION OF FUEL IN A COMBUSTION ENGINE

(75) Inventors: Vesa Hokkanen, Björnlunda (SE); Lars Dahlén, Ekerö (SE); Jonas Holmborn, Sollentuna (SE); Andreas Cronhjort, Täby (SE)

(73) Assignee: Scania CV AB (Publ) (SE)

( * ) Notice: Subject to any disclaimer, the term of this patent is extended or adjusted under 35 U.S.C. 154(b) by 1141 days.

(21) Appl. No.: 12/527,049

(22) PCT Filed: Feb. 11, 2008

(86) PCT No.: PCT/SE2008/050158
§ 371 (c)(1),
(2), (4) Date: Sep. 18, 2009

(87) PCT Pub. No.: WO2008/100212
PCT Pub. Date: Aug. 21, 2008

(65) Prior Publication Data
US 2010/0012080 A1    Jan. 21, 2010

(30) Foreign Application Priority Data
Feb. 15, 2007  (SE) ........... 0700380

(51) Int. Cl.
*F02B 3/08* (2006.01)
*F02M 45/00* (2006.01)

(52) U.S. Cl.
USPC ........... 123/298

(58) Field of Classification Search
USPC ........... 123/298, 299
See application file for complete search history.

(56) References Cited

U.S. PATENT DOCUMENTS

| | | | |
|---|---|---|---|
| 6,588,398 B1 * | 7/2003 | Rodier | 123/299 |
| 6,820,587 B1 | 11/2004 | Hoglund et al. | |
| 6,826,903 B2 * | 12/2004 | Yahata et al. | 123/568.12 |
| 7,059,295 B2 * | 6/2006 | Blessing et al. | 123/299 |
| 7,305,964 B2 * | 12/2007 | Scherrieble et al. | 123/299 |
| 2005/0205052 A1 | 9/2005 | Blessing et al. | |
| 2008/0257302 A1 * | 10/2008 | Hunter et al. | 123/295 |

FOREIGN PATENT DOCUMENTS

WO    WO 02/079623 A1    10/2002

OTHER PUBLICATIONS

John E. Dec, "A Conceptual Model of DI Diesel Combustion Based on Laser-Sheet Imaging", *SAE Technical Paper Series*, pp. 1, 6 and 22-88, Feb. 24-27, 1997.

International Search Report dated May 6, 2008, issued in corresponding international application No. PCT/SE2008/050158.

* cited by examiner

*Primary Examiner* — Stephen K Cronin
*Assistant Examiner* — Arnold Castro
(74) *Attorney, Agent, or Firm* — Ostrolenk Faber LLP

(57) ABSTRACT

In a combustion space of a combustion engine, an inlet valve to supplies a gaseous medium which contains oxygen to the combustion space. A movable piston to compress the gaseous medium in the combustion spaces. An injector injects fuel in the combustion space in a jet which comprises a multiplicity of small fuel drops. The injector injects fuel in the combustion space at such a high initial velocity that the fuel injected in the jet mixes with the gaseous medium to form a substantially homogeneous mixture before the mixture has been decelerated to a velocity at which the fuel ignites and burns. Devices may cool the gaseous medium and the fuel before entry into the combustion space.

21 Claims, 2 Drawing Sheets

ARRANGEMENT AND METHOD FOR EFFICIENT COMBUSTION OF FUEL IN A COMBUSTION ENGINE

CROSS REFERENCE TO RELATED APPLICATION

The present application is a 35 U.S.C. §§371 national phase conversion of PCT/SE2008/050158, filed Feb. 11, 2008, which claims priority of Swedish Application No. 0700380-9, filed Feb. 15, 2007, the disclosure of which is incorporated by reference herein. The PCT International Application was published in the English language.

BACKGROUND OF THE INVENTION, AND STATE OF THE ART

The present invention relates to an arrangement and a method for efficient combustion of fuel in a combustion engine by controlled injection of the fuel.

The type of combustion engines commonly known as HCCI (Homogenous Charge Compression Ignition) engines may be regarded as a combination of an Otto engine and a diesel engine. In HCCI engines, fuel and air are mixed in a combustion space to form a homogeneous lean mixture. The fuel mixture is compressed until it is self-ignited by compression heat. In this situation, the combustion takes place with a so-called premixed flame, resulting in very rapid combustion at a relatively low combustion temperature, leading to low contents of nitrogen oxides $NO_x$ in the exhaust gases. The fact that the fuel mixture is lean also results in low contents of soot particles in the exhaust gases. HCCI engines have the disadvantage that the respective components are subject to relatively heavy loads and that such rapid combustion causes considerable noise. Another disadvantage of HCCI engines is that it is difficult to control the self-ignition so that it takes place at an optimum crankshaft angle.

In diesel engines, fuel is injected into a combustion space when the piston is about to complete the air compression stroke. At that stage the compressed air is at such a high temperature that the fuel self-ignites substantially immediately when it is injected into the combustion space. It is therefore relatively easy to control the combustion process so that it takes place at an optimum crankshaft angle. However, the fuel and the air are not premixed before the self-ignition of the fuel takes place. The combustion therefore takes place with a so-called diffusion flame. In a diffusion flame, the combustion takes place locally where the oxygen in the air and the fuel diffuse (mix) together. The combustion process is thus lengthened. The advantage of such a combustion process is that the respective components are not subject to the same mechanical stresses as in rapid combustion. However, a diffusion flame results in a combustion process which at least initially takes place with a fatter than stoichiometric mixture ratio, which may cause the formation of relatively high contents of soot particles in exhaust gases from diesel engines. Combustion with a diffusion flame is a longer combustion process and high combustion temperatures occur during parts of the process. Diesel engines therefore have relatively high contents of nitrogen oxides in their exhaust gases.

U.S. Pat. No. 6,820,587 refers to a method for controlling the injection of fuel in a combustion engine whereby the fuel is injected at a very high pressure in a combustion space. The fuel is thus at such a high initial velocity that it does not immediately react with the oxygen in the combustion space, making it possible for a larger amount of air to mix with the fuel before combustion than in a conventional diesel engine. The improved mixture of air and fuel results in combustion with a diffusion flame which has a leaner fuel mixture, resulting in a smaller amount of soot particles in the exhaust gases. The soot particles formed also burn to a certain extent when they pass through the hottest region of the diffusion flame, in which the combustion takes place at a stoichiometric ratio.

SUMMARY OF THE INVENTION

The object of the present invention is to provide an arrangement and a method for a combustion engine whereby an HCCI engine's good characteristics in terms of low discharge of nitrogen oxides $NO_x$ and soot particles can be combined with a diesel engine's easy controllability and briefer loads on the respective components.

This object is achieved with the arrangement of the invention. When fuel is injected at a very high velocity in a gaseous medium which includes oxygen, the chemical reactions which normally result in combustion of the fuel do not occur. However, fuel injected into a combustion space is subject to rapid deceleration by the gaseous medium. The fuel has therefore to be injected at an initial velocity which clearly exceeds the lowest velocity at which such combustion does not take place, to make it possible for a homogeneous mixture of fuel and the gaseous medium to be created before the mixture self-ignites. Creating a homogeneous lean mixture before the self-ignition takes place thus results in combustion with a premixed flame and not a diffusion flame. The combustion will therefore take place in substantially the same way as in an HCCI engine, resulting in low contents of nitrogen oxides and soot particles in the exhaust gases.

According to a preferred embodiment of the present invention, the injection means is adapted to injecting fuel in the combustion space for a period of time which is of such a length that fuel is also injected into the combustion space when the first fuel injected during that period has already mixed with the gaseous medium to form a substantially homogeneous mixture and has burnt. Since a homogeneous mixture ignites and burns substantially immediately, it is desirable to achieve a longer combustion process in order to reduce the stresses and wear on the respective components. Adding the fuel at two or more separate times in quick succession within a specified period of time makes it possible to distribute the combustion energy over a plurality of premixed flames during that period. The load and wear on the respective components can thus be reduced. With advantage, however, the injection means is adapted to injecting fuel continuously during said period. The fuel can thus be injected and mixed continuously with the gaseous medium to form a substantially homogeneous mixture which substantially continuously ignites and burns during said period. Continuous combustion of fuel with premixed flames is substantially as easy to control as the combustion in a diesel engine in that it is in principle controlled by the time at which the fuel is injected into the combustion space.

According to another preferred embodiment of the present invention, the arrangement comprises a high-pressure pump adapted to imparting to the fuel a pressure of such a magnitude as to make it possible for the fuel to be injected at said initial velocity in the combustion space. A conventional high-pressure pump can impart to the fuel a necessary pressure to enable injection at said initial velocity. Fuel at said necessary high pressure may be obtained substantially directly from a high-pressure pump or indirectly via an accumulator tank ("common rail"). With advantage, the injection means comprises at least one aperture of such size and shape as to result in a fuel jet with such a thin cross-section that the fuel in the jet will mix with the gaseous medium to form a substantially homogeneous mixture before it ignites. The thinner the fuel jet injected into the combustion space, the more quickly the gaseous medium can mix with the fuel in the least readily accessible central portions of the jet and achieve a substantially homogeneous mixture of the fuel and the gaseous medium.

According to another preferred embodiment of the present invention, the inlet valve is adapted to leading a gaseous medium which contains air into the combustion space. Air is readily available and contains a relatively large proportion of oxygen. To increase the capacity of the combustion engine, air in compressed form may be led into the combustion space, in which case the arrangement comprises with advantage a cooling element for cooling the air before it is led into the combustion space. A so-called charge air cooler may here be used for cooling the air after compression to a temperature close to the temperature of the surroundings before it is led into the combustion space. The lower the temperature of the air, the lower the combustion temperature and the lower the content of nitrogen oxides in the exhaust gases.

According to another preferred embodiment of the present invention, the inlet valve is adapted to leading into the combustion space a gaseous medium which contains recirculating exhaust gases. The presence of exhaust gases lowers the oxygen content in the combustion space, making it possible for the fuel to be injected at a somewhat lower velocity before it reacts with the surrounding oxygen in the combustion space, thereby enhancing the possibility of creating a homogeneous mixture before the self-ignition. Exhaust gases in the combustion space also reduce the combustion temperature, thereby further reducing the content of nitrogen oxides in the exhaust gases. The arrangement preferably comprises a cooling element for cooling the recirculating exhaust gases before they are led into the combustion space. Such a so-called EGR cooler can lower the temperature of the recirculating exhaust gases considerably before they are led into the combustion space. A low initial temperature of the exhaust gases results in a lower combustion temperature and a reduced content of nitrogen oxides in the exhaust gases. An alternative to recirculation of exhaust gases is to retain a residual amount of exhaust gases in the combustion space from a preceding combustion process.

According to another preferred embodiment of the present invention, the arrangement comprises a cooling element for cooling the fuel before it is injected into the combustion space. Fuel is at a raised temperature when it has been pressurised in a high-pressure pump. Cooling the fuel before it is injected into the combustion space will lower the combustion temperature and to some extent also reduce its tendency to react with the oxygen in the combustion space. The content of nitrogen oxides in the exhaust gases can thus be further reduced and the possibility of achieving a substantially homogeneous mixture before the fuel self-ignites can be further enhanced.

The object of the invention is also achieved with the method of the invention which is based on the operations of the described elements of the above described embodiments.

BRIEF DESCRIPTION OF THE DRAWINGS

A preferred embodiment of the invention is described below by way of example with reference to the attached drawings, in which.

DETAILED DESCRIPTION OF A PREFERRED EMBODIMENT OF THE INVENTION

Figure 1:
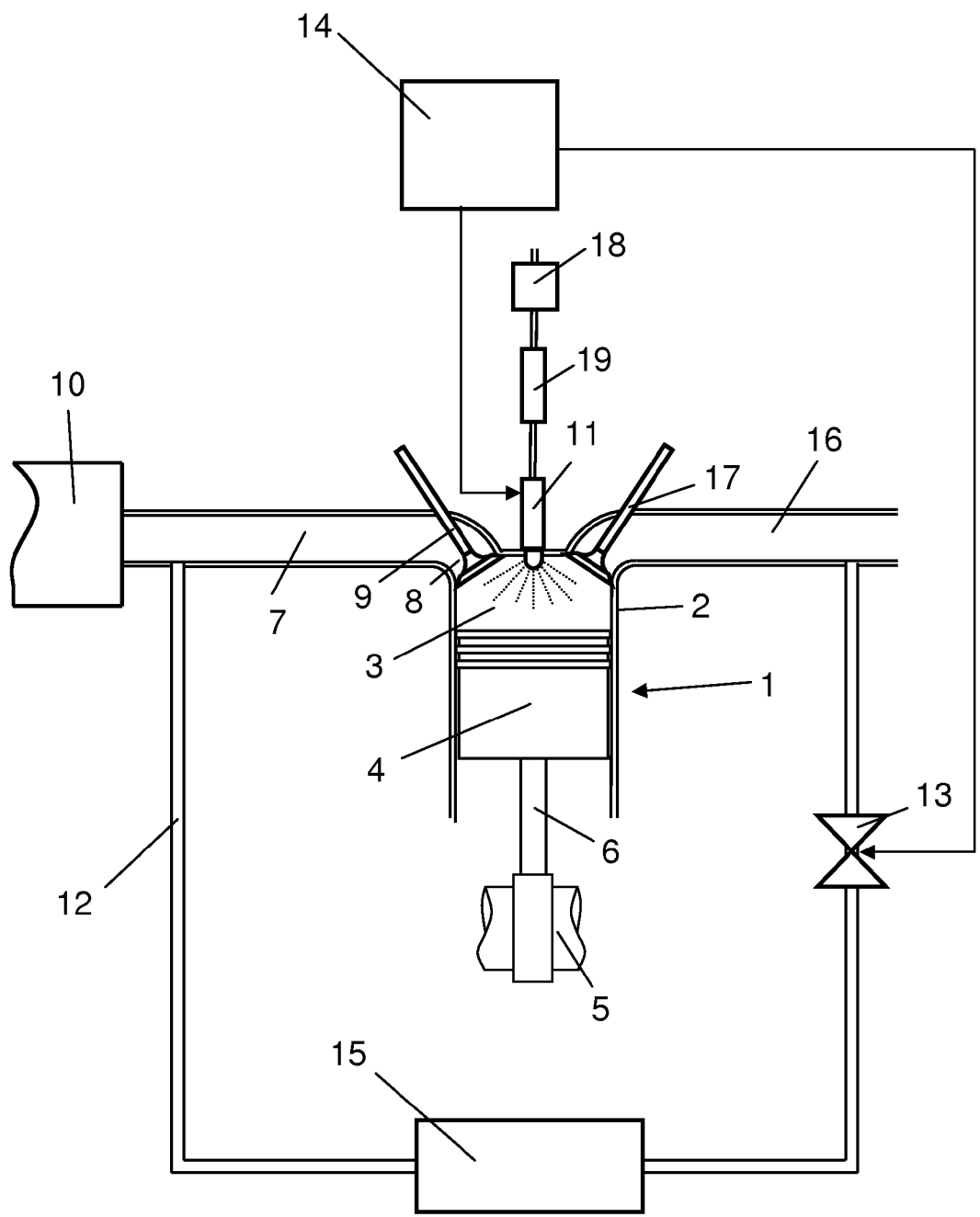
FIG. 1 depicts an arrangement for a combustion engine according to the present invention.

FIG. 1 depicts a cylinder 2 of a supercharged combustion engine 1. The cylinder 2 comprises a combustion space 3 bounded downwards by a movable piston 4. The piston 4 is connected to a crankshaft 5 by a connecting rod 6. The movements of the piston 4 in the cylinder 2 are converted to rotary motion by the crankshaft 5. The combustion engine 1 may comprise any desired number of such cylinders 2. An inlet line 7 is connected via an aperture 8 to the combustion space 3 to make it possible to supply compressed air to the combustion space 3. An inlet valve 9 is arranged in the aperture 8 to control the supply of air to the combustion space 3. A charge air cooler 10 is arranged in the air line 7 to cool the air before it is led into the combustion space 3. The inlet line 7 is connected to a return line 12 for recirculation of exhaust gases. The return line 12 comprises an EGR valve 13 by which it is possible to recirculate a desired amount of exhaust gases to the inlet line 7. The return line 12 also comprises an EGR cooler 15 by which it is possible to cool the recirculating exhaust gases before they are led into the inlet line 7.

A control unit 14 is adapted to controlling an injection means 11 so that it injects an optimum amount of fuel at desired times. A high-pressure pump 18 is adapted to imparting a very high pressure to the fuel and a cooling element 19 is adapted to cooling the fuel before it is injected into the combustion space 3. The injection means 11 is provided with a plurality of apertures for injecting fuel at a high pressure in the form of a plurality of jets in the combustion space 3. The control unit 14 is also adapted to controlling the EGR valve 13 so that it adds a desired amount of exhaust gases to the air in the inlet line 7. The control unit 14 may be a computer unit provided with suitable software for performing said functions. An exhaust line 16 is intended to lead away the exhaust gases from the combustion processes in the combustion space 3. The discharge of exhaust gases from the combustion space 3 is regulated by an exhaust valve 17. The return line 12 has an extent such that it can lead exhaust gases back from the exhaust line 16 to the inlet line 7.

During operation of combustion engine 1, the control unit 14 controls the EGR valve 13 so that a desired amount of exhaust gases is led into the inlet line 7. When the piston 4 moves downwards in the cylinder 2, the control unit 14 opens the inlet valve 9 so that air and exhaust gases are drawn into the expanding combustion space 3 from the inlet line 7. At the time when the piston 4 turns at the extreme lower position, the inlet valve 9 closes. The subsequent upward movement of the piston 4 causes compression of the air and exhaust gases in the combustion space 3. The air and exhaust gases in the combustion space 3 thus undergo a temperature increase which is related to the degree of compression. At the time when the piston 4 reaches an extreme upper position, the control unit 14 activates the injection means 11 to inject fuel at a high pressure in the combustion space 3. The fuel ignites and burns in the combustion space 3. The pressure increase caused by the combustion of the fuel results in the piston 4 being pushed downwards. When the piston 4 has passed the extreme lower position, the control unit 14 opens the exhaust valve 17. During its upward movement, the piston 4 pushes the exhaust gases formed during the combustion process out to the exhaust line 18.

Figure 2:
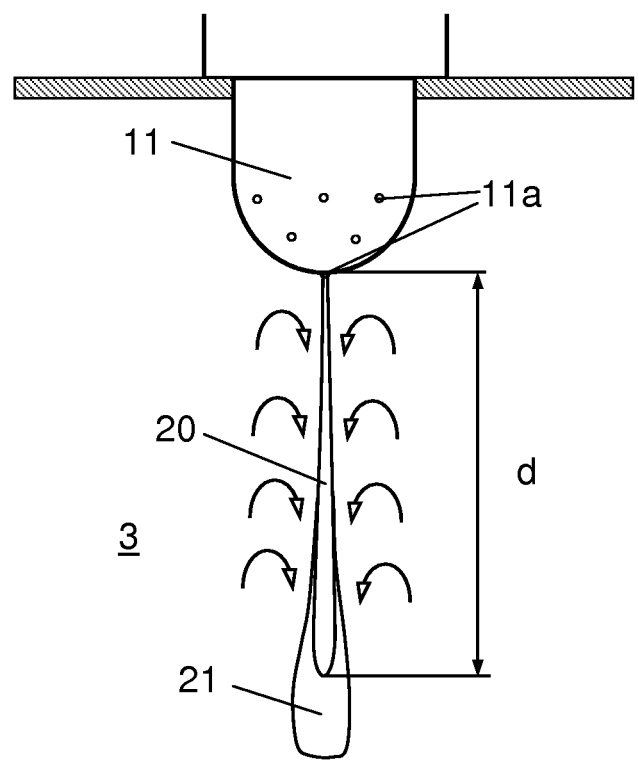
FIG. 2 depicts the injection of the fuel in FIG. 1 in more detail.

FIG. 2 depicts the fuel injection process in more detail. The injection means 11 has a suitably shaped surface with a plurality of apertures 11a. The injection means 11 is adapted to spraying fuel out at high pressure through each of said apertures 11a so that the fuel is distributed in an optimum manner in the combustion space 3. A fuel jet 20 is formed from each of said apertures 11a. Such a fuel jet 20 is depicted in FIG. 2. Since the high-pressure pump 18 imparts a very high pressure to the fuel while at the same time the apertures 11a have small dimensions, the fuel in the jets 20 is at a very high initial velocity when they are injected into the combustion space 3. When it enters the combustion space 3, the fuel is finely divided into a multitude of small fuel drops which constitute said fuel jet 20. The fuel is thus supplied in spray form to the combustion space 3. The initial velocity of the fuel is such that the fuel will not react with surrounding oxygen in the combustion space 3, but the velocity of the fuel is progressively decelerated by the compressed warm mixture of air and exhaust gases in the combustion space 3. When the fuel has moved a distance d into the fuel space 3, it will have been decelerated to a velocity at which it can be ignited by surrounding oxygen. The ignition takes place in a combustion zone 21 at an end of the fuel jet 20.

During the movement of the fuel through said distance d, a progressive mixing of air in the fuel jet 20 takes place. The fuel jet 20 will thus comprise an increasing amount of added air. The injection means 11 is adapted to imparting to the fuel an initial velocity such that fuel and air will mix to a substantially homogeneous mixture over said distance d. The result is a premixed lean fuel mixture which ignites and burns in the combustion zone 21 with a so-called premixed flame. A combustion process with a premixed flame takes place substantially simultaneously throughout the combustion zone 21. Combustion processes with a premixed flame take place rapidly and at a relatively low combustion temperature, thereby forming low contents of nitrogen oxides in the exhaust gases. Since the fuel mixture is lean, there are substantially no soot particles in the exhaust gases from the combustion process.

The injection means 11 is adapted to continuously injecting fuel into the combustion space 3 for a specified period of time which is at least long enough for fuel to be still being injected into the combustion space 3 when the first fuel injected during that period has already mixed to form a substantially homogeneous mixture and has burnt. Such continuous supply of fuel maintains a fuel jet 20 with a continuous inflow of fuel for a specified period of time. The fuel in the fuel jet 20 mixes progressively with surrounding air in the combustion space 3 to form a substantially homogeneous mixture before ignition and combustion take place in the combustion zone 21. The result is continuous combustion processes with premixed flames in the combustion zone 21 during said period. Such longer combustion causes a relatively slight load on the respective components. The control of the combustion pattern is no more complicated than in a conventional diesel engine, since it is substantially determined by the time for the injection of the fuel.

To make it possible to add air to the fuel jet so that a substantially homogeneous mixture can be achieved over the distance d before the self-ignition of the fuel takes place, it is therefore necessary that the fuel be injected at a very high initial velocity. It is also necessary that the size and shape of the apertures 11a of the injection means be such as to result in a fuel jet 20 with a relatively thin cross-sectional area. The thinner the jet 20, the more quickly the air can penetrate and mix with the fuel in the least readily accessible central portions of the jet so that a homogeneous mixture is created. Adding exhaust gases to the air reduces the oxygen content in the combustion space 3, making it possible for the fuel to be at a somewhat lower velocity before it reacts with the surrounding oxygen in the combustion space 3. The distance d before the fuel mixture self-ignites will therefore be somewhat longer, enhancing the possibility of creating a homogeneous mixture before the self-ignition takes place. The presence of exhaust gases in the combustion space 3 also lowers the combustion temperature. The proportion of nitrogen oxides in the exhaust gases is thereby further reduced. Cooling the exhaust gases in the EGR cooler 15 before they are led into the combustion space 3 further reduces the combustion temperature and the content of nitrogen oxides in the exhaust gases. A further measure to facilitate the creation of a homogeneous mixture before self-ignition is to cool the air in a cooling element 10 before it is led into the combustion space 3. In particular, this needs to be done when using compressed air which has undergone a temperature rise during the compression. Finally, the fuel may be cooled before it is injected into the combustion space, which takes place in the cooling element 19.

The invention is in no way limited to the embodiment described but may be varied freely within the scopes of the claims. The initial velocity at which the fuel is injected into the combustion space and the velocity at which the fuel self-ignites are not constant values. These velocities vary with the type of fuel, the pressure in the combustion space at the time of injection, the composition of the gaseous medium in the combustion space, etc.

The invention claimed is:

1. An arrangement for producing a combustion mixture from a jet of fuel into a combustion space in a combustion engine, the arrangement comprising
a combustion space, an inlet valve configured and operable to supply a gaseous medium which contains oxygen to the combustion space,
a movable piston in the space and configured and movable to compress the gaseous medium in the combustion space,
an injector configured and operable to inject fuel in the combustion space in a jet which comprises a multiplicity of small fuel drops, the injector being configured and operable to inject fuel in the combustion space at such a high initial velocity that the fuel injected in the jet mixes with the gaseous medium to form a substantially homogeneous mixture before the injected fuel has been decelerated to a velocity at which it ignites and burns.

2. An arrangement according to claim 1, wherein the injector is configured and operable to inject fuel in the combustion space for a period of time selected such that fuel is also injected into the combustion space when the fuel that was earlier injected during the period of time has already mixed with the gaseous medium to form a substantially homogeneous mixture and the earlier injected fuel has burnt in the combustion space.

3. An arrangement according to claim 2, wherein the injector is configured and operable to inject fuel continuously during the period of time.

4. An arrangement according to claim 1, further comprising a high-pressure pump configured and operable to impart to the fuel being injected via the injector a pressure of a magnitude which causes the injector to inject the fuel at the initial velocity in the combustion space.

5. An arrangement according to claim 1, wherein the injector comprises at least one injection aperture of such size and shape configured to achieve a fuel jet with such a thin cross-section that the fuel in the fuel jet mixes with the gaseous medium to form a substantially homogeneous mixture before the fuel ignites.

6. An arrangement according to claim 1, wherein the inlet valve is operable to lead into the combustion space a gaseous medium which contains air.

7. An arrangement according to claim 6, further comprising a cooling element configured and operable for cooling the air before the air is led into the combustion space.

8. An arrangement according to claim 6, wherein the inlet valve is configured and operable to lead into the combustion space a gaseous medium which also contains recirculating exhaust gases.

9. An arrangement according to claim 8, further comprising a cooling element configured and operable for cooling the recirculating exhaust gases before the gases are led into the combustion space.

10. An arrangement according to claim 4, further comprising a cooling element configured and operable for cooling the fuel before the fuel is injected into the combustion space.

11. A method for producing a combustion mixture from a jet of fuel into a combustion space in a combustion engine, the method comprising the steps of
supplying a gaseous medium which contains oxygen to a combustion space of the combustion engine, compressing the gaseous medium in the combustion space;
injecting fuel in the combustion space, the fuel being injected in a jet composed of a multiplicity of small fuel drops, wherein the fuel injected in the combustion space is at a high initial velocity selected such that the fuel injected in the jet mixes with the gaseous medium to form a substantially homogeneous mixture before the fuel has been decelerated to a velocity at which it ignites and burns in the combustion space.

12. A method according to claim 11, wherein the step of injecting fuel in the combustion space is performed for a period of time selected such that fuel is also injected into the combustion space when the fuel earlier injected during that period of time has already mixed with the gaseous medium to form a substantially homogeneous mixture and the earlier injected fuel has burnt.

13. A method according to claim 12, further comprising injecting the fuel continuously during the period of time.

14. A method according to claim 11, further comprising imparting to the fuel a pressure of a magnitude which causes the fuel to be injected at the initial velocity in the combustion space.

15. A method according to claim 11, further comprising forming the fuel jet with a thin cross-section selected such that the fuel in the jet mixes with the gaseous medium to form a substantially homogeneous mixture before the fuel ignites.

16. A method according to claim 11, further comprising leading into the combustion space a gaseous medium which includes air.

17. A method according to claim 16, further comprising cooling the air before leading the air into the combustion space.

18. A method according to claim 16, wherein the leading into the combustion space of a gaseous medium comprises including recirculating exhaust gases in the gaseous medium.

19. A method according to claim 18, further comprising cooling the recirculating exhaust gases before leading the exhaust gases into the combustion space.

20. A method according to claim 11, further comprising cooling the fuel before the fuel is injected into the combustion space.

21. A method according to claim 11, further comprising after the mixing to form a substantially homogeneous mixture, allowing deceleration of the mixture sufficiently to a velocity at which the fuel in the mixture ignites and burns.

* * * * *

UNITED STATES PATENT AND TRADEMARK OFFICE
CERTIFICATE OF CORRECTION

PATENT NO.        : 8,701,627 B2                                    Page 1 of 1
APPLICATION NO. : 12/527049
DATED             : April 22, 2014
INVENTOR(S)       : Hokkanen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1174 days.

Signed and Sealed this
Twenty-ninth Day of September, 2015

Michelle K. Lee
*Director of the United States Patent and Trademark Office*